United States Patent
Bierhuizen (10) Patent No.: US 7,312,913 B2
(45) Date of Patent: Dec. 25, 2007

(54) IMAGING LIGHT SOURCE WITH POLARIZATION AND COLOR RECOVERY

(75) Inventor: Serge Bierhuizen, Wilsonville, OR (US)

(73) Assignee: InFocus Corporation, Wilsonville, OR (US)

( * ) Notice: Subject to any disclaimer, the term of this patent is extended or adjusted under 35 U.S.C. 154(b) by 281 days.

(21) Appl. No.: 10/150,438

(22) Filed: May 17, 2002

(65) Prior Publication Data

US 2006/0187520 A1 Aug. 24, 2006

(51) Int. Cl.
*G02F 1/07* (2006.01)

(52) U.S. Cl. ........................ 359/247; 359/246

(58) Field of Classification Search ............... 359/247, 359/246, 242, 241; 353/30, 31, 33, 81, 84
See application file for complete search history.

(56) References Cited

U.S. PATENT DOCUMENTS

| | | | | |
|---|---|---|---|---|
| 4,798,448 | A | 1/1989 | van Raalte | |
| 5,009,483 | A * | 4/1991 | Rockwell, III | 385/116 |
| 5,098,184 | A | 3/1992 | van den Brandt et al. | 353/102 |
| 5,410,370 | A | 4/1995 | Janssen | 348/756 |
| 5,822,021 | A | 10/1998 | Johnson et al. | 348/742 |
| 5,899,551 | A * | 5/1999 | Neijzen et al. | 349/115 |
| 5,900,985 | A | 5/1999 | Ho et al. | 359/640 |
| 5,953,083 | A | 9/1999 | Sharp | 349/18 |
| 6,024,451 | A | 2/2000 | De Vaan et al. | 353/20 |
| 6,084,703 | A | 7/2000 | Dewald | 359/290 |
| 6,147,802 | A | 11/2000 | Itoh et al. | 359/500 |
| 6,227,682 | B1 | 5/2001 | Li | 362/302 |
| 6,266,105 | B1 | 7/2001 | Gleckman | 348/743 |
| 6,278,552 | B1 | 8/2001 | Ishihara et al. | 359/619 |
| 6,331,879 | B1 | 12/2001 | Sawai et al. | 349/9 |
| 6,341,867 | B1 | 1/2002 | Itoh | 353/20 |
| 6,693,689 | B1 * | 2/2004 | Kim et al. | 349/113 |
| 6,739,723 | B1 | 5/2004 | Haven | |
| 6,795,243 | B1 * | 9/2004 | McGettigan et al. | 359/486 |

(Continued)

FOREIGN PATENT DOCUMENTS

EP 1 098 536 A2 5/2001

(Continued)

OTHER PUBLICATIONS

Dewald, Scott et al.—"40.2: Sequential Color Recapture Dynamic Filtering: A Method of Scrolling Color" SID 01 Digest, vol. XXXII, 2001, pp. 1076-1079.

(Continued)

*Primary Examiner*—Timothy Thompson
(74) *Attorney, Agent, or Firm*—Schwabe, Williamson & Wyatt (57) ABSTRACT

The present invention provides a polarized colored light source for a display system in which light of other polarization states and colors are recycled. The color can be scrolled synchronously with a display. In one embodiment, the invention includes a tunnel having an entrance aperture facing a lamp to receive light having multiple polarization states from the lamp and direct the light from the lamp to an exit aperture opposite the entrance aperture, the tunnel having a reflective face about the entrance aperture to reflect light within the tunnel toward the exit aperture, a reflective polarizer to reflect light of one polarization state toward the entrance aperture and transmit light of another polarization state, and a color reflector to transmit light within one color range and reflect light of another color range toward the entrance aperture.

24 Claims, 3 Drawing Sheets

U.S. PATENT DOCUMENTS

| | | |
|---|---|---|
| 2001/0008470 A1 | 7/2001 | Dewald |
| 2001/0035940 A1 | 11/2001 | Bierhuizen |
| 2002/0176036 A1 | 11/2002 | Kaneko |
| 2003/0197837 A1 | 10/2003 | Gyu et al. |
| 2005/0001995 A1* | 1/2005 | Dewald et al. ............... 353/84 |

FOREIGN PATENT DOCUMENTS

| | | |
|---|---|---|
| WO | WO 02/096122 A1 | 11/2002 |

OTHER PUBLICATIONS

Duelli et al., "Polarization Recovery System based on Light Pipes", 8 pps.

Shimizu, "Invited Paper: Scrolling Color LCOS for HDTV Rear Projection", 2001, pp. 1072-1075.

Moench et al., "Invited Paper: New Developments in Projection Light Sources —Shorter Arcs and Miniaturisation", 2001, pp. 1274-1277.

Sharp et al., "High Throughput Color Switch for Sequential Color Projection", 2000, pp. 96-99.

Gardner et al., "New, High Performance, Durable Polarizers for Projection Displays", 2001, pp. 1287-1289.

Bachels et al., "Advanced Electronic Color Switch for Time-Sequential Projection", 2001, pp. 1080-1084.

Dewald et al., "Sequential Color Recapture and Dynamic Filtering: A Method of Scrolling Color", 2001, pp. 1076-1079.

* cited by examiner

IMAGING LIGHT SOURCE WITH POLARIZATION AND COLOR RECOVERY

BACKGROUND OF THE INVENTION

1. Field of the Invention

The invention relates generally to the field of polarized color light sources, such as light engines for viewing computer and video displays directly or by projection. More particularly, the invention relates to a light source that recovers rejected polarization states and colors to enhance brightness.

2. Description of the Related Art

Many displays used in projection and direct viewing systems operate on the basis of polarization. Such displays include reflective displays such as LCoS (Liquid Crystal on Silicon), super twisted nematic (STN), and ferroelectric (FLC) as well as transmissive displays, such as thin film transistor (TFT), poly-silicon (p-si), and Silicon-on-Insulator (SOI). These displays can produce a high resolution image by changing the polarization state upon reflection or transmission of incident light.

In an LCoS display, for example, in the dark state, a pixel reflects all light with substantially no change in polarization. In the bright state, the pixel rotates the polarization state of reflected incident light to the corresponding orthogonal state. By illuminating the display with polarized light and then filtering out nearly all reflected or transmitted light of that polarization, the display image can be viewed by the human eye or projected onto a viewing screen.

Because most conventional low cost light sources produce light with mixed polarization states, the light is typically analyzed by a PBS (Polarizing Beam Splitter). Light of one polarization direction propagates through the PBS, while light of the orthogonal polarization direction is reflected by the PBS. Another common approach is to use a polarizing filter that absorbs light of one polarization direction. Normally in such systems without a polarization conversion system, half of the light is lost either from reflection or absorption. This results in a dimmer display or requires a brighter light source. In a projector, a dimmer display is more difficult to view, while a brighter light source increases the power consumption and the cost of the projector system. Due to the additional heat typically generated, the brighter light source may require a larger housing to provide enough room for cooling or to accommodate a fan to cool the light source. The fan adds additional cost, power consumption and noise. Polarization conversion systems have been developed to recover some of the lost light. However, the most commonly used polarization conversion systems use a multi-PBS (Polarizing Beam Splitter), which is expensive.

Recent developments in faster switching Liquid Crystal and Ferro-electric LC technologies have made single panel projection systems possible. In a single panel projection system, polarized light is needed as well as sequential or scrolling color. In a field sequential single panel projection system, the display is illuminated with short bursts of red, green, and blue light while the display is synchronized to the pulsed light source to reflect the appropriate color component of the image. A white light or other color light burst can also be used alone or in combination with the red, green, and blue light. The short bursts can come from a color wheel or from pulsed LEDs (Light Emitting Diodes). The rapidly alternating red, green, and blue images are blended in human perception to form the full-color image of the display. A field sequential system requires a bright single color light source for each burst. Such light sources are typically not very bright or are very inefficient.

In a scrolling or row sequential single panel system, the colors can be scrolled across the display and the display updates one row at a time instead of updating the entire frame. This approach is particularly useful with some liquid crystal displays that have slow response times. Color wheels and drums have been developed to provide bands of color that scroll across the display as the rows of the display are updated. These use color filters to transmit light of only one color, typically red, green or blue. The rest of the light, about two-thirds, is then lost, again reducing the brightness of the display. Again a brighter light source is required to compensate for the losses. In another system, a complex combination of prisms and filters is used to scroll colored light onto a display and then redirect that light to a projection screen. This system does not lose as much light, but requires a complex precisely aligned and synchronized rotating prism system.

BRIEF SUMMARY OF THE INVENTION

The present invention provides a polarized colored light source for a display system in which light of other polarization states and colors are recycled. The color can be scrolled synchronously with a display. In one embodiment, the invention includes a tunnel having an entrance aperture facing a lamp to receive light having multiple polarization states from the lamp and direct the light from the lamp to an exit aperture opposite the entrance aperture, the tunnel having a reflective face about the entrance aperture to reflect light within the tunnel toward the exit aperture, a reflective polarizer to reflect light of one polarization state toward the entrance aperture and transmit light of another polarization state, and a color reflector to transmit light within one color range and reflect light of another color range toward the entrance aperture.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

The present invention provides both color and polarization recovery in an illumination source for reflective and transmissive displays for projection or direct viewing. The resulting illumination system is lower cost with equal or higher system performance in brightness and contrast compared to existing designs by using a light tunnel and a closely positioned reflective color filter such as a band modulation filter (BMF) or color drum. It can be applied as a PCS (polarization conversion system) for a reflective liquid crystal (LC) display in a projector system as well as in many other ways. The system is particularly well-suited to applications with sequential or scrolling color.

Figure 1:
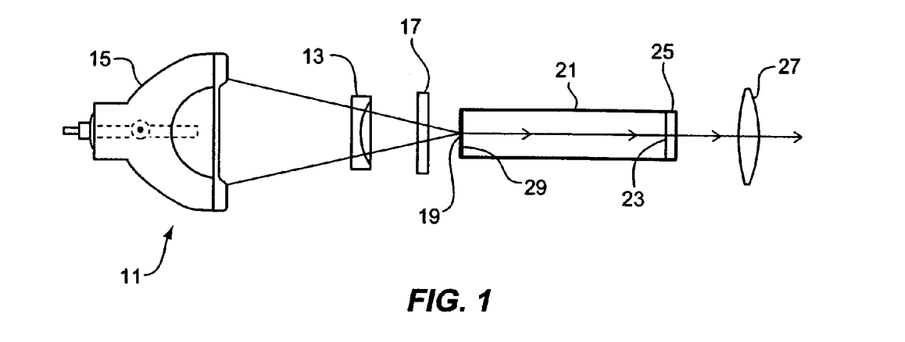
FIG. 1 is a cross-sectional diagram of a light source with a tunnel and a band modulation filter according to one embodiment of the present invention.

An example of one embodiment of the present invention is shown in FIG. 1. The embodiment of FIG. 1 is particularly suitable for a projector using a single reflective display such as an LCoS display, however any other reflective or transmissive display can be used. In the embodiment of FIG. 1, the illustrated components constitute a front light for a reflective display. In brief, light from a projector lamp system 11, is directed toward a focusing lens 13, by a reflector 15. Alternatively, the function of the focusing lens can be integrated into the reflector. The focusing lens directs it through an ultraviolet and infrared filter 17 into an entrance aperture 19 of a light tunnel 21. The light propagates through an exit aperture of the tunnel into a BMF 25. From there, it is directed through some optical system 27 to be incident on a reflective or transmissive display (not shown).

In an LCoS system, color filtered P-polarized light from the BMF can be directed to a beam splitting cube and reflected to be incident on the display. The P-polarized light is then reflected from the display as S-polarized light, reflected through the beam splitting cube and into a projector lens. The projector lens images the display on a screen. The images can be still or motion images from any type of image or video medium. The system can be used as a projector for computer generated slides and for digital sourced imagery, however, many other applications such as games, movies, television, advertising and data display can be made. The invention can also be readily adapted to transmissive displays as well as for any type of films or plates for which polarized, color-filtered illumination is desired. The display and projection system is not shown in FIG. 1, in order to simplify the drawings. The system of FIG. 1 is also coupled to various display drivers (not shown). The display drivers receive image or video signals and power and convert the signals into a form suitable for driving the BMF, the display and the lamp system.

The tunnel partially collimates the light and gives it a desired uniform cross-sectional shape. A typical tunnel has a rectangular cross-section, however, any type of light collimation device or light source may be used. For a typical projector, the desired cross-sectional shape is a rectangle designed to accommodate the aspect ratio of the projected images. The images may have an aspect ratio of, for example, 4:3 for computer displays and 16:9 for movie displays. The aspect ratio can be chosen to match that of the display 17. Various known techniques can be used to render the projected image in an aspect ratio different from that of the display, if desired.

The display and projection system (not shown) can take a variety of different forms. In one embodiment, the viewing optics are a projector lens system to project the image onto a screen. In another embodiment, the viewing optics are a viewing screen with magnifying optics. The viewing optics can include a polarizing analyzer, such as an iodine-based PVA (poly-vinyl alcohol) film, or a wire grid polarizer to filter out any stray P-polarized light, enhancing contrast. Analyzers and polarizing filters can also be placed in other locations of the system as may be appropriate for a particular application or lamp system.

Considering the example of FIG. 1 in more detail, the lamp 11 can be any of a variety of different light sources. For a projector, a suitable example is a small arc lamp referred to as an Ultra High Performance (UHP) arc discharge lamp, which currently consumes about 100 W to produce about 6000 lumens of white light with mixed randomized polarization. Such a lamp typically includes a hyperbolic reflector 15 to direct the discharge at a small area. Other light sources and lamp designs can be used depending on the particular application, including LEDs (light emitting diodes) and other solid state illumination sources.

The light from the arc lamp 11 is focused into the input aperture 19 of the tunnel 21 by a small lens 13. Such a tunnel 21 is also referred to as a polarization recycling rod or a polarization recycling tunnel or a rod-type integrator. The tunnel can be made from a solid glass rod or a high-reflectance light tunnel material with a rectangular cross-section. A hollow tunnel can be in the form of a hollow light integrator rod. It can be made of any rigid material that has or can be coated with reflective interior walls. Any kind of reflective coating, such as a silver or mirror coating can be used. The entrance and exit apertures can be formed of openings in opposing end walls and a mirror coating can be applied to the end walls around the openings as well. The features of the glass rod integrator, described below, can, for the most part, be applied as well to a hollow rod integrator.

In a glass rod tunnel, the end faces and sides can be polished flat. This regularizes the propagation of the light in the tunnel. The entrance aperture 19 can be formed at one end by applying a mirror coating 29 over the end face of the tunnel. A circular transparent area of, for example, approximately one third of the area of the end face is not mirrored to form the entrance aperture. In one embodiment, the mirror coating completely surrounds the entrance aperture. The exact size of the entrance aperture can be selected to maximize the efficiency of the rod based on the Etendue of the lamp and the projection or display optics. The light within the tunnel is homogenized on its way to the exit aperture 23 by multiple reflections off the walls of the integrator. With sufficient tunnel length, the light distribution at the end of the tunnel will be sufficiently uniform to illuminate the display. The tunnel can rely on total internal reflection along its length and can also be covered in a reflective coating.

For polarization recovery or recycling, a cholesteric polarizer 31 (see FIG. 2) is placed at the exit end of the tunnel. Although other types of reflective polarizing structures can be used, such as an anisotropic-isotropic polymer film stack or dielectric coating stack. A wire grid polarizer can also be used in place of a cholesteric polarizer. Such a polarizer is described, for example, in U.S. Pat. No. 6,122,103 to Perkins et al. A suitable wire grid polarizer is the ProFlux™ polarizer, available from Moxtek of Utah in the United States. The reflective polarizer will allow only one polarization state of the light to be transmitted. The other polarization state will be reflected back toward the entrance aperture. When cholesteric color filters are used, as in a BMF, the polarizer is a circular polarizer. For other types of color filters, a linear polarizer can be used. In one embodiment, the exit aperture 23 covers only a small portion of the end face of the tunnel and the polarizer covers the entire exit aperture. The rest of the end face is mirrored so that the mirror completely surrounds the exit aperture. In another embodiment, the exit aperture is the entire end face of the tunnel. The polarizer can be placed across the entire end face. The best size for the exit aperture will depend upon the type of color filter being used and the Etendue and other aspects of the overall optical design of the system.

The light reflected from the exit aperture returns toward the entrance aperture. Some will pass through the entrance aperture and return to the lamp, either to be absorbed, scattered or refocused back into the tunnel by the lamp's reflector 11. The rest will be reflected off the end face around the entrance aperture. The path through the tunnel can involve many oblique reflections off the walls of the tunnel and may cause changes in the polarization of the light as it is reflected back toward the exit aperture. This can be enough to allow at least some of the light to pass through the exit aperture and be used to illuminate the display. The rest of the light will be reflected again and have a third chance upon retro-reflection.

In order to increase the amount of light recovered, a polarization rotator can be placed somewhere in the light tunnel. As a result, most of the reflected light, when it returns to the exit aperture will be rotated in polarization and will be transmitted through the polarizer. The polarization rotator can be of a variety of different forms and be placed in a variety of different positions as is well-known in the art. In one example, a quarter-wave foil is placed over the reflective polarizer and another quarter-wave plate is placed about the entrance aperture with the mirror. Together these quarter-wave plates will rotate the polarization direction of the reflected light and give it a second chance at the exit. A pair of quarter-wave polarization rotation devices can increase the light output of the tunnel by eighty-five percent over a tunnel with no polarization rotator.

When a cholesteric polarizer is used as a reflective polarizer, the reflected circular polarization state will be inverted by the mirror that surrounds the entrance aperture or by the lamp reflector if the light passes through the entrance aperture. This can greatly increase the amount of light recovered without the need for a polarization rotator in the tunnel. When a linear reflective polarizer, such as a wire grid polarizer is used, the reflected light after two passes through a single quarter-wave plate will be linearly polarized in the orthogonal direction. It will then pass through the reflective polarizer. In either case, changes in polarization can also occur on reflections from the sides of the tunnel. Phase coatings can be applied to the sides of the tunnel to enhance efficiency still further.

In the embodiment of FIG. 1, the cholesteric polarizer is integrated into an electrically controllable solid state cholesteric band modulation filter (BMF) 25, that reflects light of one polarization state and any undesired colors and transmits the desired color and polarization state. As shown in more detail in FIG. 2, the BMF has a separate controllable structure 33, 35, 37 for each color. Each structure either transmits a particular color of light while reflecting the rest, or transmits all colors. Working together, the structures can be used also to reflect all colors. By controlling the structures, any three colors of light as well as black and white can be transmitted. For example, by reflecting red and green, blue is transmitted. The BMF performs a function similar to that of a color wheel in a conventional projector system to generate red, green, blue and, in some cases, white or no light for the display.

Figure 2:
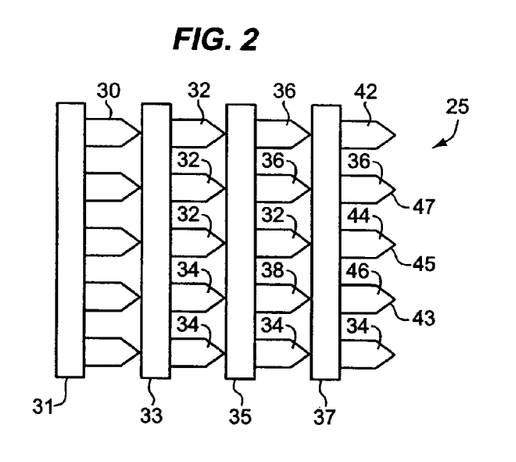
FIG. 2 is a cross-sectional diagram of a band modulation filter showing the application of scrolling color.

Such a BMF can be made from stacked cholesteric color filters in combination with quarter-wave plates and fast ferroelectric liquid crystal (FLC) switches. The cholesteric color filters act as reflective circular polarizers for a specific color range. The filter transmits light of only one circular polarization and color band and reflects the rest. The quarter wave plates convert the circularly polarized light into linearly polarized light. The FLC switches transmit the linearly polarized light with or without a rotation in polarization depending on the state of the liquid crystal. By placing another quarter-wave plate and cholesteric color filter past the FLC switch, the desired color can be transmitted and the rest reflected. Using three sets of color filters and three FLC switches with the appropriate quarter-wave plates, a switching three-color filter can be made. Other approaches can also be used to create different types of BMF's. Typically, red 33, green 35, blue 37 light bands are selected for the cholesteric filters because these colors are typically used as the components of a color display. However, the cholesteric filters can be designed for any color band desired. Additional layers can be added for particular colors that are desired to be boosted or for special display functions.

In the diagram of FIG. 2, after a pre-polarizer 31, five rays of light 30 are shown as striking a red filter structure 33 based on a cholesteric filter, a segmented FLC switch and quarter wave plates. The FLC switch is segmented with enough resolution so that each ray is handled separately. In other words, the filtering function can be controlled independently for each ray at each of the three filter structures so that the output version of each ray can be switched to the desired color. In one example, the red filter structure is switched to transmit only cyan light for the top three rays 32 and pass all light for the bottom two rays 34. The remaining light is reflected. The cyan and white rays then strike the green filter 35. The green filter can pass the third cyan ray 32 unaffected and the fifth white ray 34 unaffected. The other three rays are filtered resulting in the top two cyan rays 32 being turned to blue rays 36, and the fourth white ray 34 being turned to magenta 38. These rays then strike the blue filter structure 37. In the present example, this filter is switched to filter only the first, third, and fourth rays.

The first blue ray 36 is filtered by the blue filter so that no light passes at all, providing a black ray 42. The second blue ray is transmitted to provide a blue ray 36. The third cyan ray 32 is filtered to provide a green ray 44. The third magenta ray 38 is filtered to provide a red ray 46, and the fifth white ray 34 is not filtered and stays white. Accordingly, any one of the input white rays can be converted to any one of the three colors, black, or white. This allows the illumination on the display to be controlled by an appropriate driver and be synchronized to the display.

By changing the state of the respective FLC switch, the color of the light output of the BMF can be changed. If the cholesteric color filters are red, green and blue, then the output can be switched between red, green, and blue to alternately illuminate a display. Turning off all the filters provides black, or no light, and combining the outputs provides white as well as red, green, and blue. This type of BMF has the benefit that it has no significant absorption so that almost all of the rejected light is reflected back into the tunnel. Other types of BMF or other color reflective structures can be used. The BMF described above is provided only as an example.

Some displays are employed in a field sequential manner in which the display creates the entire image in each of the three primary colors, and perhaps white, sequentially. This requires a display and a light source that can switch quickly and it requires discontinuities in the illumination, reducing the brightness of the projected or viewed image. For a smoother and brighter picture or for use with slower and generally less expensive displays, scrolling colors are used. In a scrolling display, the display cycles through the primary colors one row at a time. At any one time, the display may be illuminated with red, green and blue light on different rows. The light source must be synchronized in order to illuminate each row with the appropriate color at the appropriate time.

Figure 3A:
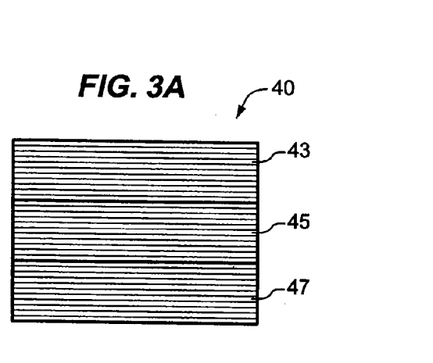
FIG. 3A is a diagram of a light frame of scrolling color produced by the embodiment of FIG. 1 at a particular instant in time.
Figure 3B:
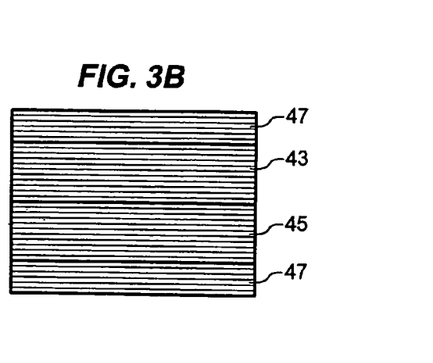
FIG. 3B is a diagram of the light frame of FIG. 3A at another instant in time.

FIGS. 3A and 3B show a diagram of light from a scrolling light source as it might be focused on a display. In FIG. 3A, the light field 40 is segmented into three bands, a red band 43, a green band 45, and a blue band 47. These bands are also referenced back to FIG. 2 to show how the rays diagrammed there can produce the bands of FIG. 3A. The bands move across the light field so that in FIG. 3B, which shows the same light field 40 at a later time, the bands have moved down the light field. The blue band has scrolled partially off the bottom of the light field and has partially reappeared at the top. This approach allows all but a few of the rows of the display to be illuminated almost constantly. Only the rows that are changing to the next color do not contribute to the image. Black bands (not shown) can be placed between the colored bands to prevent rows that are changing from affecting the display. Synchronized scrolling color displays have been developed using rotating prisms, a rotating color drum and a sequential color recapture (SCR) wheel.

The scrolling color approach can be adapted to the BMF by taking advantage of the addressable liquid crystal structure of each LCF switch. Separately addressable horizontal segmentations can be made in each of the LCF switches of the BMF, using well-known address segmentation technologies currently applied to liquid crystal displays. Since horizontal rows are not complex pixelated structures and since the rows can be densely packed, the seams between two horizontal segments can be made very small in comparison to the resolution of the system. The seams will not be noticed in the final picture, in part, because the BMF is not imaged exactly at the display, reducing the sharpness of the seams, and, in part, because small imaging artifacts in the illumination optics will tend to smear the seams.

The different segments can be addressed separately to scroll in synchronization with the display panel. Alternatively, if a slower less expensive LCD panel is used, the BMF can be timed a little ahead of the panel so that the BMF will already have changed color while the display panel is switching. This slight timing difference can also enhance the image quality on faster LCD's. If the display panel is also based on liquid crystal technologies, such as ferroelectric liquid crystals, this will make the synchronization and the construction of the two systems easier. Such technologies already support switching times faster than 100 microseconds. Existing technologies can readily be adapted to synchronize the BMF to the display.

The color of each horizontal segment can be controlled separately. By separately addressing the three FLC switches, broad stripes of red, green, blue and white can be made to scroll vertically across the display. By matching the scrolling speed of the BMF to the display, the system will produce scrolling color that will be integrated as a single color display in human perception. The number of densely packed horizontal segments can be optimized for maximum system performance. In other words, the segments will change color (R,G,B,W) in a vertical scanning direction that matches the row writing speed of the display. This approach can be applied to both transmissive and reflective displays. To increase color saturation one or more of the horizontal segments of the BMF can be turned black in between the colored stripes. This provides more time for the display to switch. Horizontal and vertical are provided here as examples for scrolling the color. The particular orientation of the segments and the scrolling can be changed. In addition, it is not necessary that straight lines be used, any progressive movement of colors across the display in any shape and direction can be used.

The BMF can also be configured with individually addressable pixels having a row and column value. These pixels can correspond to a single display panel pixel or to a group of display panel pixels, so that, using conventional LCD addressing technology similar to that used for the display, different portions of the image can be illuminated in different colors at different times. The colors of the BMF pixel groups can scroll about the display panel in any desired pattern. The block of a single color for pixels or segments of the BMF can be dynamically varied in size to optimize the display results or fixed, as suggested by the scrolling bands of FIG. 3B. The straight lines of the embodiment described above are believed to be simpler to implement and understand.

The BMF does not absorb the unwanted polarizations and colors of light, but reflects all the rejected light back into the tunnel. Reflection can be ensured, as in the illustrated embodiment, by configuring the BMF to cover the entire exit end face of the tunnel. In another embodiment, the BMF can be placed a very short distance from the exit aperture so that light that exits the exit aperture of the tunnel impinges on the BMF and is reflected back into the exit aperture. Lenses can be placed between the exit aperture and the BMF to allow the distance between aperture and BMF to be increased without significant light loss.

By configuring the BMF to transmit more than one color at the same time, the tunnel can be used to recover some of the retro-reflected, unwanted color light similar to how the tunnel is used to recover unwanted polarizations. If two or more scrolling or stationary colors can be transmitted through the BMF at the same time, as shown in FIG. 3A, then any colors reflected back into the light pipe will get a second chance. The colors reflected from the BMF will reenter the pipe and be reflected back toward the exit aperture of the light pipe by the mirror about the entrance aperture. As with the polarization recovery, a portion of the light that misses the reflector and propagates out the entrance aperture may be reflected back into the tunnel through the entrance aperture by the lamp reflector 15. This light may also be recovered. Traveling back and forth from the entrance aperture to the exit aperture, there may be some reflections within the tunnel that will change the orientation of the retro-reflected light rays. The light then has a chance to exit the exit aperture and impinge again on the BMF. If, upon this second time at the BMF, it strikes a portion of the BMF that transmits the color, then the light is recovered. If not, it will again be reflected and have a third chance until it eventually is absorbed or escapes out of the system.

With polarization recovery, the light is very likely to be recovered the second time through the exit aperture because the tunnel rotates the polarization of retro-reflected light. With color recovery, there need not be a wavelength or color converter. The colored light reflected from the BMF was reflected because the portion of the BMF which it hit was set to reflect that particular color. Another portion of the BMF may have transmitted the color. In being reflected back into the tunnel and then back toward the exit aperture any one ray of the reflected light will probably hit the BMF at a different location. If that location is set to transmit a different color, then that portion may transmit the previously rejected light. If the BMF allows all colors to be transmitted through different segments of the BMF at the same time, then a large portion of the reflected colors can be recovered. A three color system with red green and blue scrolling color can be configured so that all three colors are transmitted simultaneously through different scrolling color bands as shown in FIGS. 3A and 3B. Such a color recovery system can increase the light output by thirty to forty percent.

It will be understood to a person of average skill that some bands of color will always be reflected away from the display to increase contrast, sharpen colors, and reduce heat. These include colors outside the visual range such as infrared and ultraviolet as well as color bands in-between the selected transmitted colors. In addition, in particular applications, including monochromatic displays with polychromatic light sources it may be appropriate to add some color conversion system to the tunnel in order to improve the amount of recovered light. The color display without such a converter is more efficient than absorptive systems with very little complexity.

The BMF can also be used dynamically to improve the contrast of the viewed image. Many display panels do not operate consistently at the dark end of the brightness range. For example, the voltage curve of many transmissive panels becomes non-linear when the panel nears the dark (reflective) state. These limitations of the display gray scale can cause visible deviations from the intended image. The BMF can be operated to reduce the illumination on the scene during bright scenes so that the display can be operated in a brighter and more linear and predictable portion of its dynamic range. Consider a display panel that, for a particular image, is to reduce the brightness of a pixel by one-twentieth of the full brightness and assume that the voltage response curve of the panel becomes non-linear for each pixel and inconsistent between pixels at about one-fifteenth brightness and darker. The BMF can be used to cut the brightness on the whole display or on the particular pixel by one half, then, in order to produce one-twentieth brightness, the panel need only reduce the light by one-tenth. One-tenth, in this example, is within the linear range of the panel. Algorithms well-known in the art can be used to analyze particular scenes and determine when such a dynamic contrast adjustment is necessary, e.g. for appropriate dark scenes. The drivers for the BMF and the LCD can then be used to coordinate the settings of the BMF and LCD to achieve the desired effects.

Figure 4:
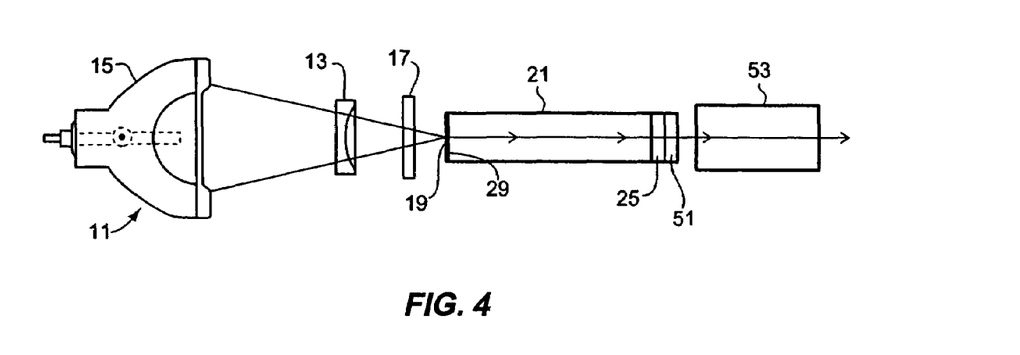
FIG. 4 is a cross-sectional diagram of a light source and a band modulation filter with integrated display according to one embodiment of the invention.

FIG. 4 shows another embodiment of the present invention in which the display panel 51 is integrated with the BMF. As in FIG. 1, light from a lamp 11 is focused by a reflector 15 and a focusing lens 13 into the entrance aperture 19 of a light tunnel 21. The light tunnel, as with FIG. 1, can be designed with a reflective surface 29 about the entrance aperture and a polarization converter, such as a quarter-wave plate somewhere in the tunnel to rotate the polarization of retro-reflected light from the BMF 25. The BMF covers the entire end of the tunnel opposite the entrance aperture but alternatively can cover only a smaller exit aperture portion of the end face. In contrast to FIG. 1, a liquid crystal display panel 51 is integrated onto the end of the BMF. Alternatively, the display panel can be spaced a short distance from the BMF. If the distance is sufficiently short, no further imaging optics, as suggested by FIG. 1, may be needed. The display panel serves as a transmissive display light modulator. Light that is transmitted through the display is imaged by a projector lens 53 onto a viewing screen. The projector lens can be simple, compound or folded and take any of a variety of different forms well-known in the art.

The light source can be an arc lamp, as mentioned above with respect to FIG. 1, or any other source of white light of mixed polarization including light emitting diodes. The display panel can also take any of a variety of different forms for transmissive display panels. Liquid crystal display panels can easily be combined in a single structure with ferro-electric liquid crystal (FLC) switches such as those commonly used in BMF's. However, any other type of transmissive display panel can be sandwiched together with the BMF. The distance between the BMF components and the display panel can modified to suit particular applications. In one embodiment the distance between the display panel and the nearest FLC switch is substantially the same as the distance between the FLC switches.

The embodiment of FIG. 4 provides polarization recovery and color recovery through the tunnel in the same manner as the embodiment of FIG. 1. Unwanted polarization states are reflected from the initial reflective polarizer 31 back into the tunnel for recycling. Unwanted colors are reflected from the cholesteric filters of the BMF back into the tunnel for recycling. In addition, unwanted light from the display is also reflected back into the tunnel for recycling. As mentioned above, with a BMF with cholesteric filters, the retro-reflected circularly polarized light will be rotated in the tunnel if there is a mirror about the tunnel entrance aperture. This will convert it to the desired polarization state without the need for a separate polarization rotator in the tunnel.

Integrating the tunnel with the recycling characteristics of the display creates still further benefits in the brightness of the viewed image. In addition, the projection or viewing optics 53 can be placed very close to the display 51. This allows the projection or viewing optics to be made with a very short back focal length which can result in a much more compact optical system. The short back focal length and compact light source together can provide a much more compact overall system design.

In some display panels, light corresponding to dark portions of the scene is reflected back toward the light source. In the example of FIG. 4, as well as in any of the other example embodiments of the invention, this can cause the reflected light to be recycled. If the light is reflected back to the display at a bright portion of the scene, then the light will be recycled and will brighten the bright portions. The result is an improvement in the viewer's perception of the scene brightness and an improvement in the efficiency of the system. While the overall brightness will not be improved, the peak brightness will be. Most video and photographic scenes have significant dark portions so the amount of recycled light is significant. The greater the amount of dark in the scene, the more the bright pixels will be brightened. This makes the bright pixels stand out more clearly from the dark surroundings. It also more closely corresponds to the effect created on a typical cathode ray tube display.

In displays that transmit both bright and dark portions of the scene with different polarizations, an absorptive dichroic polarizer is typically used to transmit the bright portion and absorb the dark portion. This results in the correct scene being displayed but it also causes a significant amount of the illumination to be absorbed. With the color recycling capabilities of the present invention much of the absorbed light can be recaptured even with display panels that transmit the dark portions instead of absorbing the dark portions. The dichroic polarizer between the display panel and the viewer can be replaced with a reflective polarizer of any of the types mentioned above, including a dichroic polarizer or a passive BMF filter. Typically, the transmitted light is linearly polarized so, for example, a properly oriented wire grid polarizer placed very close to the display will cause all of the transmitted light for dark pixels to be transmitted back through the display and the BMF and into the tunnel. In the tunnel the light will undergo several reflections and return to the tunnel exit aperture where it may be recycled. This reflective polarizer approach can be applied to any of the embodiments described herein.

In another embodiment, the BMF and the display or light modulation panel can be further consolidated. With some display panels, each pixel is assigned to transmit or reflect a particular color and a corresponding reflective color filter is positioned over each pixel. So, for example, the display is manufactured so that a reflective red filter (that reflects all colors but red) is placed over each pixel that is assigned to red. The neighboring blue and green pixels have corresponding blue and green filters. Such displays using liquid crystal technology are commercially available for microcomputer direct viewing display panels and are sometimes referred to as reflective cholesteric LCD's. The reflective pixel filters can also be based on dichroic coatings. They can have any of a variety of different pixel patterns, including RGB and Bayer. Color can be recycled using a very simple structure by replacing the separate scrolling BMF and display of FIG. 4 with a passive reflective pixel panel as described above.

Upon such a replacement, each pixel will reflect all colors but the desired color back into the tunnel. After several reflections, including a reflection off the opposite end of the tunnel, light reflected from the display will impinge again upon the display, most likely, at a different location, and thus a different pixel. The color components that are appropriate for the pixel which it strikes may be transmitted, otherwise, they will again be reflected for a third chance at another pixel. This will repeat until the light is either transmitted or absorbed. A similar effect will be achieved, as discussed above, for light reflected off dark pixels. Depending on the design of the display, light that strikes dark or partially darkened pixels will either be reflected back into the tunnel or transmitted with a particular polarization state. If the rejected light is reflected directly into the tunnel, then it may be recycled if it strikes different pixel upon reflection. If the pixel is dark due to polarization effects, then an appropriate reflective polarizer, as described above can be used to reflect the light back into the tunnel for recycling.

The present embodiment does not require scrolling color for color recycling and yet can achieve a similar improvement in brightness. The effects described above of enhancing peak brightness can also be achieved. In addition, the display can be configured so that the area between pixels is also reflective. Typically, a black mask is provided between the switchable transmitting and reflecting pixel elements. This mask can be made reflective, e.g. an aluminum coating, to protect the underlying circuitry from radiation and heat. The reflective mask will also reflect rejected light back into the tunnel where it can be further recycled. This light would otherwise be lost to absorption within the crystal structure, reducing the life span of the display and the brightness of the scene.

In another embodiment, a transmissive drum is used with the light pipe. The transmissive drum also accommodates scrolling color displays, such as liquid crystal displays in a transmissive or reflective system. A folded optical system reflects the light out of the drum to be directed to a single panel display projection or viewing system.

Figure 5:
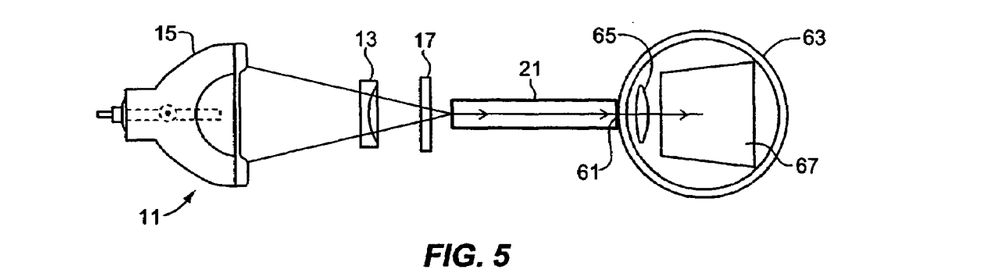
FIG. 5 is a cross-sectional diagram of a light source with a tunnel and a color drum according to a second embodiment of the present invention.
Figure 6:
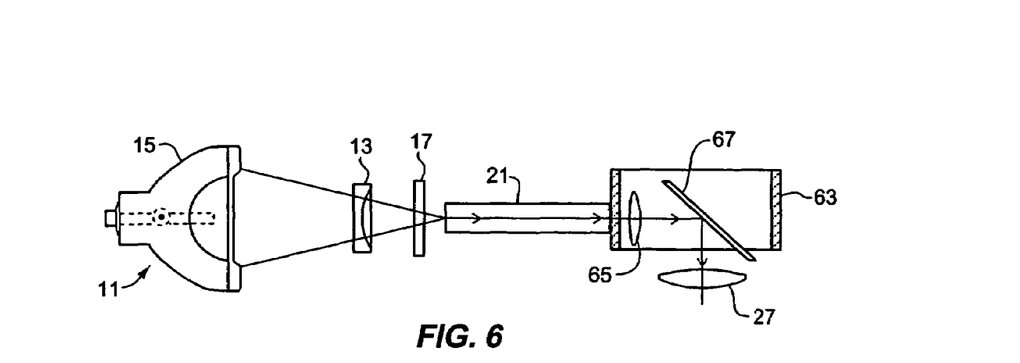
FIG. 6 is a cross-sectional diagram of a top view of the light source of FIG. 5.

Referring to FIGS. 5 and 6, the light from the arc lamp 11 is filtered 17 and focused 13 into the input aperture of a light tunnel or light pipe 21. At the opposite end of the tunnel a reflective polarizer 61 reflects one polarization state back towards the entrance aperture of the tunnel. This reflective polarizer can be of any of the various types described above. It can cover the entire end face or only a smaller exit aperture in the end face. As in the embodiment described above, at the entrance end of the tunnel a quarter-wave plate and mirror rotate the polarization direction and reflect the light back toward the exit. With reflected circularly polarized light, the mirror at the tunnel entrance can act as the polarization rotator.

A cylindrical, transmissive color wheel or color drum 63 is placed immediately outside the exit aperture. A lens 65 with a short focal length relays the light so that it can be folded out of the transmissive drum with a fold mirror 67. A further optical system 27 directs the light to the display panel (not shown). As with the BMF, if there are two or more colors present on the drum in front of the tunnel, a portion of the reflected colors of the light can be recycled after it goes back into the tunnel and is reflected off the mirror about the tunnel's input aperture. FIG. 6 shows the drum in cross-section cut across a diameter so that the fold mirror can be better understood.

The particular positioning of the drum with respect to the tunnel's exit aperture will depend on the particular implementation. Efficiency is enhanced if light reflected from the drum is coupled back into the exit aperture of the tunnel. Similarly, efficiency is enhanced if light from the tunnel's exit aperture that is transmitted through the drum can be imaged onto the display. A simple and effective design is to place the drum as close to the tunnel as can be physically accomplished within reasonable fabrication tolerances. Since the transmissive drum is effectively very close to the exit of the tunnel and the diameter of the drum is large compared to the exit aperture of the tunnel, the drum and any coatings on it can be approximated as a planar surface.

After folding the light out of the drum it can be imaged onto a transmissive or reflective scrolling color panel. As with the BMF, the rotation speed of the segments of the drum are synchronized with the row writing speed of the panel. The drivers for the drum and panel (not shown) can be constructed using techniques well-known in the art.

The drum can be constructed in a variety of different ways. One such drum can have several dichroic filter color segments on the cylindrical surface of the drum, alternating between red, green, blue and white. Dark or mirrored segments between the segments can allow for a transition state for the pixels of the display between colors. The dichroic filters are configured to transmit the desired color and reflect all other colors. They can be attached to the drum on a separate transparent substrate or film or they can be applied as coatings to the drum's surface. The transparent surface of the drum can be made of any of a variety of optically transparent materials. Because the light passing through the drum is already polarized, the drum substrate can be made of optical glass or any suitable plastic with a low stress birefringence such as polycarbonate and acrylic. It and any anti-reflective and adhesive coatings are transmissive. Accordingly, as with the BMF, unwanted colors are reflected back into the tunnel for recycling. Desired colors are passed through the drum to the fold optics. Alternatively, the drum can use cholesteric color filters on the transparent substrate. Cholesteric filters also act as reflective polarizers so that the single cholesteric filter coating or surface can accomplish both the polarizing and the color filtering functions simultaneously.

For a tunnel exit aperture that is 12 mm wide by 6.75 mm high (for a 16:9 aspect ratio) and a drum that scrolls the colors vertically across the exit aperture, each color segment can be about 2.25 mm high. If a white band is also to be used then the segments must be thinner, about 1.6 mm high. In such an example, a drum with a 36.5 mm diameter would have a circumference of about 114 mm. That allows for 51 2.25 mm segments or 17 image fields of red, green and blue.

The size of the drum can be increased to allow for slower rotational speeds. This may reduce noise, vibration and power consumption. Alternatively, a much smaller drum can be used to achieve a more compact system. As the drum is made increasingly smaller, the surface facing the tunnel will become increasingly curved. This can reduce the amount of light that is reflected back into the exit aperture at the edges and also affect how cleanly the light is imaged on the display.

In both the example of the BMF and of the color drum, the figures and description suggest that the red, green and blue bands should be the same size. On the contrary, the scrolling color bands on the BMF, the drum or any equivalent structure can have different dimensions. This allows the white color point to be optimized for the light source, the screen, the display, the optical components or any other aspect of the system. In addition, a white band can be added to any of the systems to enhance the brightness of white fields within an image. Colors other than red, green and blue can also be used and combined to form a color display. This allows the present invention to accommodate a greater range of light sources and display effects.

In one embodiment, the reflective polarizer at the exit aperture is instead incorporated into the drum between the drum substrate and the color filters. As light strikes the drum it will first pass through or be reflected by the color filters and then pass through or be reflected by the reflective polarizer. The reflective polarizer can be of any of the types described above. In another embodiment, stripes of passive cholesteric color band filters are layered onto the drum. These filters are configured to transmit one polarization state of one color and reflect the rest. This allows for simultaneous polarization and color recovery in a very simple structure.

Figure 7:
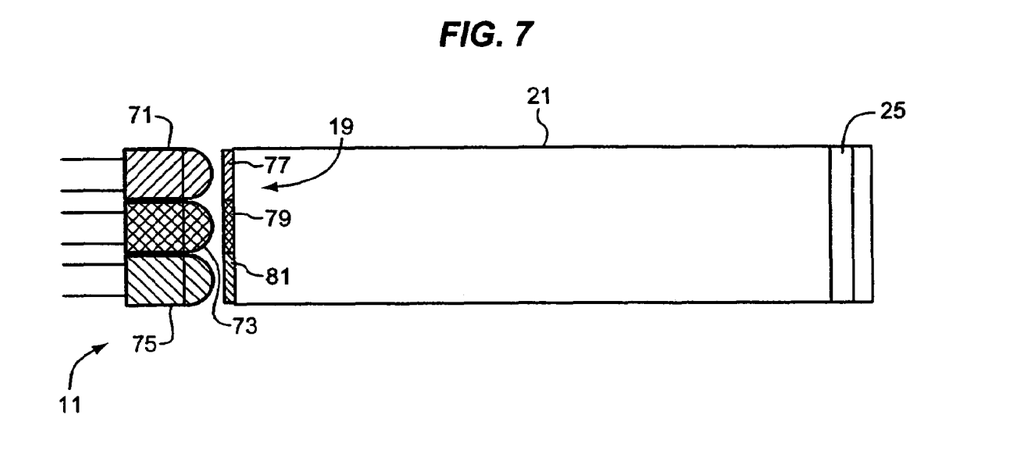
FIG. 7 is a cross-sectional diagram of an alternative LED based light source that can be used in any of the embodiments of FIGS. 1, 4, 5, and 6.

FIG. 7 shows an alternative light source that can be used with any of the embodiments of the invention discussed above. While white LED or LED based light sources can be used as the lamp 11, as mentioned above, colored light sources, including LEDs, can also be used. In FIG. 7, the light source 11 is shown as an array of LED's stacked in rows of red 71, green 73, and blue 75, although other colors can also be used instead or in addition. As mentioned above, in a projector embodiment, the present invention can provide light in an aspect ratio of from 4:3 to 16:9 or wider. If the tunnel 21 is designed so that the input aspect ratio matches the output aspect ratio, then each row of LED's can be from 4 to 6 LED's wide. Alternatively, only three LED's can be used. The actual number of LED's can be varied depending on the desired tunnel input aperture and the size of the LED housings, as well as price, power and size constraints. The LED's can also be provided in an array other than one of rows and columns as shown.

The LED's are mounted in a bracket or holder (not shown) which can be designed to reflect light toward the tunnel and to pack the LED's as closely together as possible. The LED housings can also be used to reflect light toward the tunnel. The LED's are placed close to the entrance aperture 19 of the tunnel in order to optimize the coupling of light into the tunnel from the LED's. At the entrance aperture, there is a separate color reflector, such as a dichroic or cholesteric transmissive color coating, for each LED. This coating can be applied on the outer surface of the tunnel if the tunnel is a solid glass rod integrating tunnel. For a hollow tunnel, the entrance aperture can be made of a transparent material and coated on either the interior or exterior side or both. Alternatively, or in addition, the LED housings or the holder for all of the LED's can be coated with the appropriate reflective color filter. The efficiency of the coatings can be improved by placing the coated surfaces close to or against the tunnel so that light from the tunnel reflected off an LED will be coupled back into the tunnel.

According to this embodiment, each red LED will face a red dichroic coating 77 that will transmit red light from the LED into the tunnel and reflect any other colors away from the tunnel. The LED's of different colors can be separated from each other by the bracket or some other device so that, for example, only light from the red LED will strike the red coating. The coatings can be arranged in rows to align with rows of LED's or in any other pattern depending upon the ordering of the LED array. Similarly, a green dichroic coating 79 is provided for each green LED and a blue dichroic coating 81 is provided for each blue LED. The dichroic coatings also serve as reflective mirror surfaces for any retro-reflected light that is already in the tunnel. If light of any other color than red strikes the red dichroic coating, then it will be reflected. Red light will pass through to the LED where it may be reflected back into the tunnel depending on the design of the LED housing and any bracket or holder.

At the exit aperture of the tunnel, a polarizing reflector and reflective light filtering device 25, such the BMF, reflective cholesteric LCD, and color drum described above, or any other device can be used. The light passing through the light filtering device is incident on a display for projection or viewing as with the embodiments described above. In operation, the light from each LED is coupled through the respective cholesteric filter into the tunnel. Some light will be reflected off the side walls of the tunnel, while other rays will impinge directly on the light filter 25. If the light strikes in the right color region, then it will be transmitted and be incident on the display. If not, then the light, or a component of it, will be retro-reflected back toward the LED's. From there it will be reflected off the dichroic surfaces at the entrance aperture and possibly be recovered as it travels back toward the tunnel exit aperture. As with the other embodiments, above, it is not necessary that the filters cover the entire exit and entrance apertures as shown. Either or both ends can have a smaller aperture surrounded by a mirror surface. The many reflections likely within the tunnel will homogenize the light and direct reflected light to a different portion of the exit aperture at each return. As a result, much of the light can be recovered.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in diagram form. The specific details may be supplied by one of average skill in the art as appropriate for any particular implementation.

Importantly, while embodiments of the present invention are described with reference to a video projector, the apparatus described herein are equally applicable to any type of illumination system for a polarization-based display, whether for projection or direct viewing, whether compact or not. For example, the techniques described herein are thought to be useful in connection with computer and data device displays, television and movie projectors, internet appliance viewers, and entertainment systems for video and game players.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A polarized light source system comprising:
a tunnel having an entrance aperture facing a lamp to receive light having multiple polarization states from the lamp and direct the light from the lamp to an exit aperture opposite the entrance aperture, the tunnel reflective having a reflective face about the entrance aperture to reflect light within the tunnel toward the exit aperture;
a reflective polarizer to reflect light of one polarization state toward the entrance aperture and transmit light of another polarization state;
a color reflector including a band modulation filter located at the exit aperture of the tunnel to transmit light within one color range and reflect light of another color range toward the entrance aperture, wherein the reflective polarizer is integral with the band modulation filter.

2. The system of claim 1, further comprising a polarization rotator within the tunnel to convert the polarization of the light reflected from the reflective polarizer to another polarization state.

3. The system of claim 2, wherein the polarization rotator comprises a quarter-wave plate proximate the reflective face about the entrance aperture.

4. The system of claim 3, wherein the reflective face and the quarter-wave plate comprise coatings on a surface of the tunnel.

5. The system of claim 1, wherein the lamp comprises an arc lamp.

6. The system of claim 1, wherein the lamp comprises a light emitting diode.

7. The system of claim 1, wherein the tunnel comprises a hollow light integrator rod with reflective interior walls and wherein the entrance aperture is surrounded by a coated mirror surface on the inside wall of the rod surrounding the entrance aperture.

8. The system of claim 1, wherein the tunnel comprises a solid glass light integrator rod and wherein the entrance aperture is defined by a coated mirror surface on the rod surrounding the entrance aperture.

9. The system of claim 1, wherein the band modulation filter is configured to produce bands of different color filters simultaneously across a face of the band modulation filter.

10. The system of claim 1, further comprising a transmissive display panel integral with the band modulation filter.

11. The system of claim 1, wherein the color reflector comprises a cholesteric filter.

12. The system of claim 1, wherein the color reflector comprises a cholesteric filter stacked with a ferroelectric liquid crystal.

13. The system of claim 12, wherein the ferroelectric liquid crystal comprises a plurality of individually addressable segmentations, each segment being addressable to switch from an active polarization conversion state to an inactive state.

14. The system of claim 1, further comprising a display panel to modulate light from the tunnel to render an image, the display panel having a plurality of pixels corresponding to portions of the image and wherein the color reflector comprises a plurality of reflective color filters adjacent to each pixel to filter the light for the respective pixel.

15. The system of claim 1, wherein the reflective polarizer comprises a wire grid polarizer.

16. The system of claim 1, wherein the reflective polarizer comprises a cholesteric filter.

17. The system of claim 16, wherein the cholesteric filter comprises a coating on a liquid crystal substrate.

18. The system of claim 17, wherein the liquid crystal substrate comprises a substrate of the band modulation filter, wherein the band modulation filter is an electronic band modulation filter.

19. A polarized light source system comprising:
a tunnel having an entrance aperture facing a lamp to receive light having multiple polarization states from the lamp and direct the light from the lamp to an exit aperture opposite the entrance aperture, the tunnel having a reflective face about the entrance aperture to reflect light within the tunnel toward the exit aperture;
a reflective polarizer to reflect light of one polarization state toward the entrance aperture and transmit light of another polarization state;
a color reflector to transmit light within one color range and reflect light of another color range toward the entrance aperture, wherein the color reflector comprises a dichroic filter stacked with a wire grid polarizer.

20. A polarized light source system comprising:
a tunnel having an entrance aperture facing a lamp to receive light having multiple polarization states from the lamp and direct the light from the lamp to an exit aperture opposite the entrance aperture, the tunnel having a reflective face about the entrance aperture to reflect light within the tunnel toward the exit aperture;
a reflective polarizer to reflect light of one polarization state toward the entrance aperture and transmit light of another polarization state;
a color reflector to transmit light within one color range and reflect light of another color range toward the entrance aperture, wherein the reflective polarizer comprises a coating on a dichroic filter.

21. A method for generating polarized color-patterned light comprising:
receiving light at an entrance aperture of a tunnel, the light having multiple polarization states;
directing the light through the tunnel from the lamp to an exit aperture opposite the entrance aperture;
reflecting light of one polarization state from the exit aperture of the tunnel toward the entrance aperture and transmitting light from the tunnel of another polarization state by a polarizer integral with a band modulation filter;
reflecting light from the tunnel within one color range toward the entrance aperture and transmitting light from the tunnel of another color range by the band modulation filter at the exit aperture; and
reflecting light reflected toward the entrance aperture toward the exit aperture.

22. The method of claim 21, wherein transmitting light of another polarization state comprises transmitting light through the exit aperture.

23. The method of claim 21, wherein reflecting light of one polarization state toward the entrance aperture comprises reflecting light into the exit aperture toward the entrance aperture.

24. The method of claim 21, further comprising rotating the polarization state of the light reflected toward the entrance aperture of the tunnel.

* * * * *